Sept. 18, 1962  C. H. PHILLIPS ETAL  3,054,927
MEANS FOR EXTENDING COVERAGE IN AN AREA MOVING TARGET RADAR
Filed Dec. 30, 1960
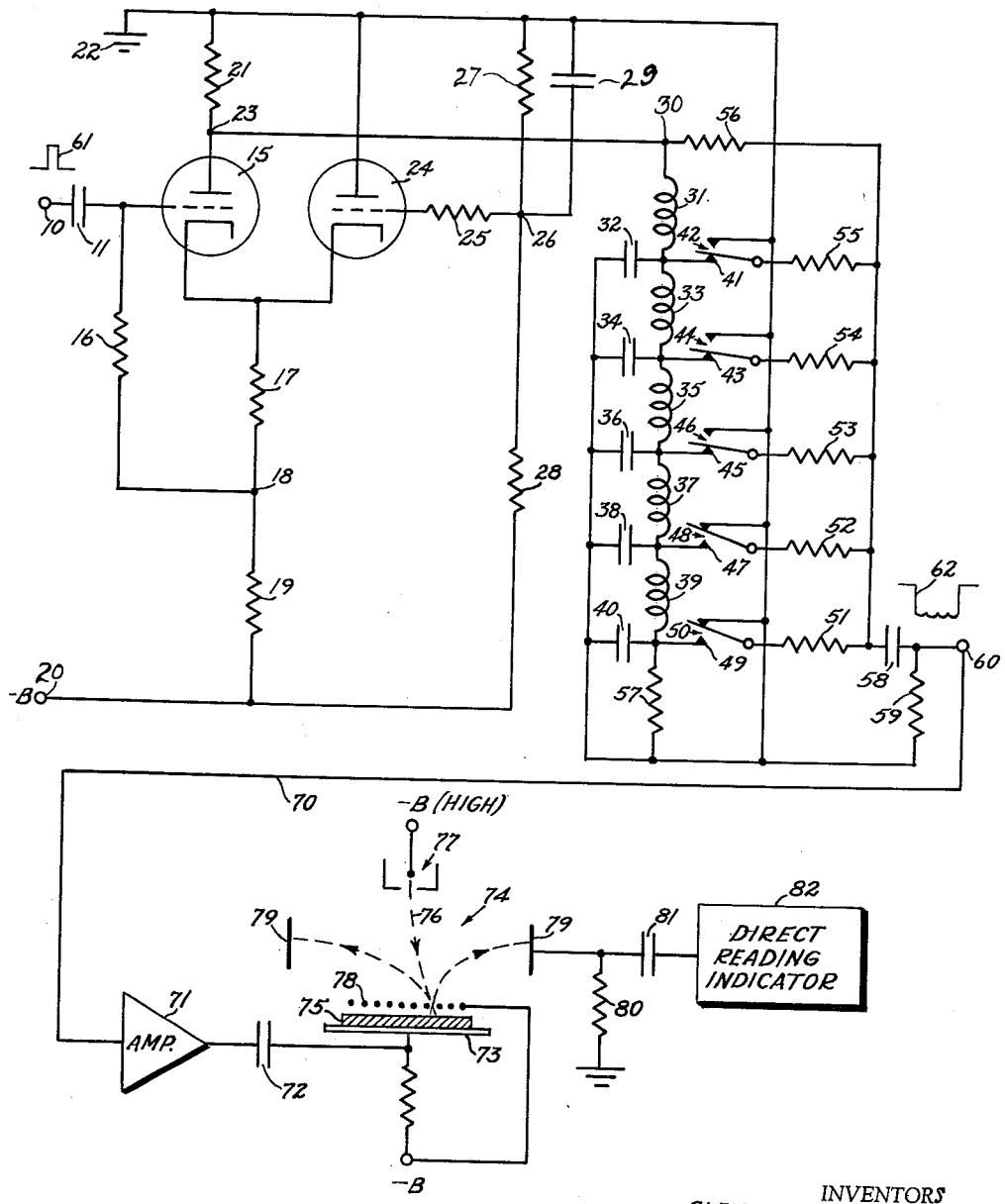
INVENTORS
CLEM HESTER PHILLIPS
HOWARD M. SCOTT
BY
H. H. Loecke
ATTORNEYS

3,054,927
MEANS FOR EXTENDING COVERAGE IN AN AREA MOVING TARGET RADAR

Clem H. Phillips, Chatsworth, Calif., and Howard M. Scott, Moorestown, N.J., assignors, by mesne assignments, to the United States of America as represented by the Secretary of the Navy
Filed Dec. 30, 1960, Ser. No. 79,941
8 Claims. (Cl. 315—12)

This invention relates generally to moving target radar systems and more particularly to a means for extending the range of coverage in the storage or memory tube of a moving target indicator (MTI) radar system by stretching radar target echo signals applied to the backplate control means of the storage or memory tube.

In the radar art the MTI radar system is used to detect moving targets within the scope of coverage of the radar transmitted energy. One form of MTI system uses an input to a "Radechon" storage tube which stores radar return information from one cycle or revolution of sweeps, for example, of the radar beam over an area of ground. The stored information is then compared with an input from a next succeeding cycle or revolution of antenna sweeps, each sweep being compared with a corresponding sweep, whereupon the output of the "Radechon" circuit through its cancellation process is representative of moving targets or objects only. Fixed or stationary targets or objects in the radar beam are reduced in magnitude. Accordingly, the output from the "Radechon" circuits is useful for such purposes as a display on a direct reading storage tube representing moving targets or objects intercepted by the radar beam. Inasmuch as the useful range of such an MTI system is sometimes limited by the number of storage elements in, and the storage characteristics of, the "Radechon" tube, there has been a need for a means of extending the range coverage possible with a given "Radechon" tube.

The present invention makes possible the use of a single "Radechon" tube in an MTI system for a considerably greater range than is normally possible by conventional methods. According to a typical embodiment of the present invention, the video output from the radar system is amplified and inverted by a triode amplifier to drive a delay line and a resistive adder. This combination produces an output which begins coincidentally with the radar video signal at the radar output but which is stretched by a constant time to produce a radar video signal that will be equal to the video signal plus the stretch time. The duration of the output is controllable and can be adjusted according to the range coverage desired with the system. The output of the resistive adder is then coupled through an amplifier to the "Radechon" tube where it is useful because of its greater duration than the radar video input, to represent range storage which is greater than would be possible in the absence of this invention. It is possible, for example, by making the output pulse of the resistive adder double the width of the radar video signal, to increase the scan area that can be stored on a single "Radechon" target element by a factor of two.

It is accordingly, a general object of this invention to extend the range, and thus the area, of that portion of the radar display which can be stored on a single "Radechon" tube for an MTI display. It is another object of this invention to provide means for extending the range of coverage in an MTI radar system using a storage tube which, by conventional methods, has a somewhat limited range storage capacity. Other objects and possible uses and advantages of the present invention may be recognized when the description thereof is read in connection with the single FIGURE of drawing wherein there is shown schematically a typical embodiment of this invention.

Referring to the figure of drawing there is shown a terminal 10 which is used for a video signal input from the radar system. Terminal 10 is connected through coupling capacitor 11 to the control grid of triode 15. The anode of the triode 15 is coupled through resistance 21 to a source of reference potential (ground) 22. The cathode of the triode 15 is coupled through resistance 17 and resistance 19 in series to a source of negative potential available at terminal 20. A biasing resistance 16 is connected between the grid of triode 15 and a junction 18 between resistance 17 and resistance 19 to provide a grid bias for the triode 15. There is a clamping triode 24 having its anode directly connected to ground 22 and its cathode connected in common with the cathode of triode 15. The grid of triode 24 is connected through resistance 25 to junction 26 of a voltage divider consisting of resistance 27 and resistance 28 connected in series between ground 22 and the source of negative potential at terminal 20. A capacitor 29 is connected across resistance 27. The anode output of triode 15 appearing at junction 23 is fed through a current limiting resistance 56 to the input terminal of coupling capacitor 58. The other terminal of capacitor 58 is connected to output terminal 60. The output of triode 15 is also connected from terminal 30 to a delay line having inductances 31, 33, 35, 37, and 39 in series. With each inductance there is a capacitance 32, 34, 36, 38, and 40, respectively, connected to ground, one terminal of each capacitance being common to adjacent inductances. Each common capacitor-inductor terminal is connected to a switch contact 41, 43, 45, 47, and 49, respectively, of switches 42 through 50, respectively, which switches may be switched to a resistive adder including resistances 55, 54, 53, 52, and 51, respectively, all of which have a common junction with resistance 56 and the input terminal of capacitor 58. The terminal of each of the resistance elements of the resistive adder, which is opposite the common junction with resistance 56 and capacitance 58, is connected to the switchable contact of each switch by means of which a delay line section may be associated with such resistance. This delay line includes the capacitance 32 connected between ground and the junction of inductances 31 and 33. The additional delay lines are established by the capacitor 34 connected between ground and the junction of inductances 33 and 35; the capacitance 36 connected between ground and the inductances 35 and 37; capacitor 38 connected between ground and the junction of inductances 37 and 39; and the capacitance 40 connected to ground and one end of the inductance 39 which end is also connected through resistance 57 to ground. Each switch has one contact connected to ground. The switchable contacts of switches 42, 44, 46, 48, and 50 are connected through the resistances 55, 54, 53, 52, and 51, respectively, to the common input to coupling capacitor 58. The output terminal 60 is connected through a resistance 59 to ground.

While the construction and operation of a "Radechon" tube is well-known this tube is illustrated in a schematic form herein to aid in the description of the invention incorporating the "Radechon" in the invention combination. This combination makes possible a new resultant output from the "Radechon" not possible without the invention herein disclosed.

The output terminal 60 of the pulse stretching circuit is coupled by way of conductor means 70 through an amplifier 71 and a coupling capacitor 72 to the backplate 73 of a "Radechon" storage tube generally identified herein by the reference character 74. The "Radechon" may be of the conventional type in which "storage" or "memory" of voltage signals is accomplished by storage on a dielectric surface called the target 75. The charge is developed on the dielectric target surface by secondary emission, as on the mosaic of an iconoscope, or the like. The dielectric target surface 75 is scanned by a beam 76 from an electron gun 77 as in conventional camera and picture tubes, this beam passing through the barrier grid 78. A chain of pulses representing radar returns coming by way of 70 and 72 for one sweep cycle of the radar antenna is compared with a chain from a second sweep cycle. By cancelling the second chain from the first, only the signals that have changed position in the interval between antenna sweep cycles are passed to the collector 79. The collector voltage is impressed across the resistor 80 and the signals applied through the coupling capacitor 81 to a direct reading indicator 82, or similar device of use. Since only moving targets can change position, the device permits moving targets to be distinguished from stationary targets, including clutter. The ground area that can be covered using a single "Radechon" storage tube can be increased by increasing the pulse width of radar echo signals and decreasing the velocity of the electron beam and storing these echo signals on the insulated target 75 by application to the backplate 73. If the pulse width is doubled, the ground area that can be stored on a single target surface is multiplied by a factor of two. Accordingly, the area covered by an MTI indicator device may be extended in accordance with the switching arrangement of the switches 42–50 in the pulse stretching and delay line circuitry.

Operation

In the operation of the embodiment of the invention just described, a unit of range is assigned to each storage element in the "Radechon." For example, one storage element can be made to represent a certain unit of range at some given displacement from the radar antenna. The next storage element would represent a different unit of range and similarly, the various storage elements of the "Radechon" could represent various units of range in any one direction, for example, radially from a specific location on the storage surface such as its center. A single storage element is capable of storing information from one reflected target pulse, i.e. one pulse width. If the energy in a two microsecond pulse returning from a target to the antenna is representative of being spread over a ground distance of one-sixth mile, the stretching of the pulse by two to produce a four microsecond pulse and storing this information in a single storage element is the same as though the "Radechon" target was working with an actual four microsecond target pulse from a radar set which would be returning pulse packets representative of covering one-third mile of ground distance. Thus, the coverage has been increased by a factor of two. This type arrangement would be useful where "Radechon" output is used with a direct reading storage tube for plan position indications as at 82. When a specific range is assigned to a storage element on the storage surface of the tube, a certain required sweep speed is naturally required. If one desires to assign a greater range to each element of the same storage surface, the "Radechon" sweep speed would have to be decreased. Nevertheless, in order to produce a storable impression on the "Radechon" tube, the duration of a pulse signal applied to the "Radechon" would have to be approximately the same as was used previously with the faster sweep. It is, therefore, necessary in order to use the storage tube with the slow sweep and yet use radar video information having conventional pulse widths, to produce a signal of the pulse coincident with radar video signal but having a longer duration than the radar video signal. This longer signal is applied to the "Radechon" tube. The present invention accomplishes this effect by first taking a radar video signal of two microseconds, for example, and which might appear as shown by the waveform designated by reference character 61 in the drawing. The present invention then produces a stretched output at terminal 60 having a leading edge substantially coincident with the radar video input signal but having a trailing edge delayed as required to provide a useful information in the storage tube. The output signal appears approximately as shown by reference character 62 in the drawing.

The input signal at terminal 10 is coupled through capacitor 11 to the grid of the normally conducting triode 15. A positive signal input causes the triode 15 to conduct more heavily raising the potential at cathode of tube 15 slightly thus reducing conduction in triode 24 which was also normally conducting. This causes a further increase in current through triode 15 producing a drop in potential at its anode which is coupled through resistance 56 and coupling capacitor 58 to the output terminal 60. Triode 24 will regulate the common cathode voltage at points below ground in order that the delay line case could be at ground potential for minimum reflections and the system operated in a linear manner. In effect, the triode 15 produces an amplified and inverted form of the input signal 61. At the same time as the input signal 61 arrives and the output is produced at anode of tube 15, the output is fed from junction 30 into the various sections of the delay line beginning with inductance 31. To achieve various degrees of signal stretching, the delay line is provided with the various switches noted above in the description. For example, in order to produce an eight microsecond pulse output in response to a two microsecond video signal input, if each section of the delay line produces a two microsecond delay, the movable contacts of switches 42, 44, and 46 are connected to terminals 41, 43, and 45 of the delay line and with each of these delay line terminals having a two microsecond delay an eight microsecond output is produced at terminal 60 of the form shown by reference character 62. This output is then fed through amplifier 71 to the "Radechon" backplate 73 for storage on the target 75 and comparison with the output produced by the next succeeding video signal input at the terminal 10. If the pulse output at terminal 60 is of a duration twice that at the video input at terminal 10, the maximum range which can be stored on the "Radechon" target is double that which could otherwise be stored there. At the same time the cancellation ratio obtained by the "Radechon" tube is maintained the same as it would be if the tube were used with the regular video input signal. By this means the range coverage of an MTI radar system is extended for more desirable indications of moving targets.

While the foregoing description has described a preferred embodiment of the present invention it should be understood that other embodiments and uses thereof are possible which would be within the scope of this invention and we wish to be limited only by the appended claims.

What is claimed is:

1. In a moving target indicating radar system having a read-in, read-out storage tube with storage elements therein representative of radar range and responsive to video signals for storing said video signals of specific range value and adjustable means to adjust the sweep velocity, a range extending means comprising: an input for video signals representative of targets; a pulse stretching network including an amplifier and a delay line, said amplifier being coupled to said input and having an output coupled in parallel to a pulse stretching network output and to said delay line, the delay line output of which is coupled to said pulse stretching network output; and a storage tube having a means to reduce the electron beam sweep velocity and a backplate control means coupled to said pulse stretching network output and adjusted in sweep velocity for stretch pulses whereby the radar video signals are applied to said storage tube in stretched condition thereby extending the range of coverage of the signal information stored.

2. In a moving target indicating radar system having a read-in, read-out storage tube with storage elements therein representative of radar ranges and responsive to video signals for storing said video signals of specific range value and adjustable means to adjust the sweep velocity, a range extending means comprising: an input for video signals representative of targets; a pulse stretching network including an amplifier of two triode tube components having the first triode tube component thereof coupled to said input for video signals with the output from the anode thereof, and the second triode tube component being a clamping triode cathode coupled with the first triode tube component and fixed in grid bias to produce fast rise time of signal amplification of said first triode tube component, and said pulse stretching network further includes a delay line of a plurality of selectively switchable delay circuits and a resistive adding network for selectively switching said delay circuits in and out of said delay line and for adding the selected outputs of said delay circuits for said pulse stretching network on an output thereof whereby the degree of pulse stretching of said video signals is selectable and the leading edges of the input and output video signals are coincident; and a storage tube having a means to reduce the electron beam sweep velocity and a backplate control means coupled to said pulse stretching network output and adjusted in sweep velocity for stretched pulses whereby the radar video signals are applied to said storage tube in stretched condition thereby extending the range of coverage of the signal information stored.

3. A pulse stretching circuit for a moving target radar system comprising: an amplifier and an adjustable delay line coupled to receive pulse voltage signals at an input to said amplifier and to produce stretched pulse voltage signals on an output of said delay line, said amplifier having an output coupled in parallel through a current limiting resistance and through said adjustable delay line to said delay line output, the delay line having delay network sections switchable in and out of said delay line to adjust the delay of pulse voltage signals on the output thereof whereby the degree of stretching applied pulse voltage signals is selectively adjustable.

4. A pulse stretching circuit as set forth in claim 3 wherein said delay network sections each have inductive and capacitive elements therein switchable alternatively between a fixed potential and said delay line output, each delay network section being constructed and arranged in its time constant to produce a predetermined delay in a pulse voltage signal.

5. A pulse stretching circuit as set forth in claim 4 wherein said adjustable delay line includes a resistance adding network coupled between said delay network sections and said delay line output for adding the stretched outputs of said delay network sections in said delay line output.

6. A pulse stretching circuit as set forth in claim 5 wherein said amplifier includes two triode tube components, the first triode tube component which amplifies pulse voltage signals applied to the grid thereof and the second triode tube component cathode coupled to the first triode tube component and grid biased to a fixed potential to regulate the cathode voltage and establish a fast rise leading edge on the amplified anode output of said first triode tube component coincident with the leading edge of each input pulse voltage signal.

7. A pulse stretching circuit for stretching video range coverage signals for application to storage tubes to extend the range coverage stored therein, the invention which comprises: an input for video signals representative of target echoes; an amplifier coupled to said input for amplifying said video signals on an output thereof; an adjustable delay network having a plurality of delay network sections selectively switchable in and out of said adjustable delay network between the input and the output thereof, said output of said amplifier being coupled in parallel through a current limiting resistance and through said adjustable delay network to the output thereof, said delay network sections each having capacitive and inductive elements arranged therein to produce a time constant of delay for each amplified video signal applied thereto; and a resistance adding circuit coupled to said adjustable delay output to add the selected outputs of said delay network sections on an output thereof whereby the video signals are adjustably stretched in accordance with the number of delay network sections switched into said adjustable delay network and adaptable to be applied from the adding circuit output to a storage tube.

8. A pulse stretching circuit as set forth in claim 7 wherein said amplifier includes two triode tubes having the cathodes thereof coupled in common, the first triode tube adapted to receive the video signals on the grid thereof and amplify same on the anode output thereof, and the second triode tube regulating the cathode voltage and upon the application of said video signal to said first triode tube to develop each amplified video signal with the leading edge coincident in time with the leading edge of the applied video signal.

References Cited in the file of this patent

UNITED STATES PATENTS 2,989,743    Varela ---------------- June 20, 1961

FOREIGN PATENTS 121,534    Australia -------------- June 3, 1946